United States Patent [19]

Grolman et al.

[11] Patent Number: 5,458,825
[45] Date of Patent: Oct. 17, 1995

[54] UTILIZATION OF BLOW MOLDING TOOLING MANUFACTURED BY STEROLITHOGRAPHY FOR RAPID CONTAINER PROTOTYPING

[75] Inventors: Cory P. Grolman, Ann Arbor, Mich.;
David R. Angst, West Allis, Wis.;
Kevin D. Gaydosh, Adrian, Mich.

[73] Assignee: Hoover Universal, Inc., Plymouth, Mich.

[21] Appl. No.: 324,276

[22] Filed: Oct. 14, 1994

Related U.S. Application Data

[63] Continuation of Ser. No. 106,471, Aug. 12, 1993, abandoned.

[51] Int. Cl.$^6$ .......................... B29C 33/38; B29C 35/08; B29C 41/02; B29C 49/00
[52] U.S. Cl. ............... 264/401; 264/40.1; 264/225; 264/308; 264/523; 364/476
[58] Field of Search ................ 264/22, 40.1, 225, 264/226, 236, 308, 523; 364/468, 476; 395/119

[56] References Cited

U.S. PATENT DOCUMENTS

| | | | |
|---|---|---|---|
| 4,575,330 | 3/1986 | Hull | 425/174.4 |
| 4,641,270 | 2/1987 | Lalloz et al. | 364/476 |

OTHER PUBLICATIONS

Michael Burdick, "Thermo–Vacuum Formed Parts Using A Stereolithography Hold", Proceedings of the Fourth International Conference on Rapid Prototyping, Jun. 14–17, 1993, pp. 75–83.

Stan W. Thomas, "Optimizing Composite Part Design And Manufacture Using Stereolithography Tooling"; Proceedings of the Third International Conference in Rapid Prototyping; 1992 pp. 267–279.

Paul Jacobs; "Stereolithography: From Art to Part" reprinted from Cutting Tool Engineering, vol. 45 No. 3 Apr. 1993.

*Primary Examiner*—Leo B. Tentoni
*Attorney, Agent, or Firm*—Leonard J. Kalinowski; E. L. Levine; Joseph E. Root, III

[57] ABSTRACT

A method for producing a prototype of an article includes generating a data file utilizing a computer aided design apparatus to provide data representing all of the geometry and contours for the inner cavity of the mold required to mold the article, using the data file to create the mold as a physical object directly from photosensitive resin utilizing a stereolithographic apparatus whereby the mold which is created utilizing the stereolithographic apparatus has a mold cavity having the geometry and contours required to blow mold the prototype of the article, positioning the mold in the blow molding apparatus, introducing a preform into the mold; and expanding the preform against the surface of the inner cavity of the mold to produce the prototype of the article.

6 Claims, 3 Drawing Sheets

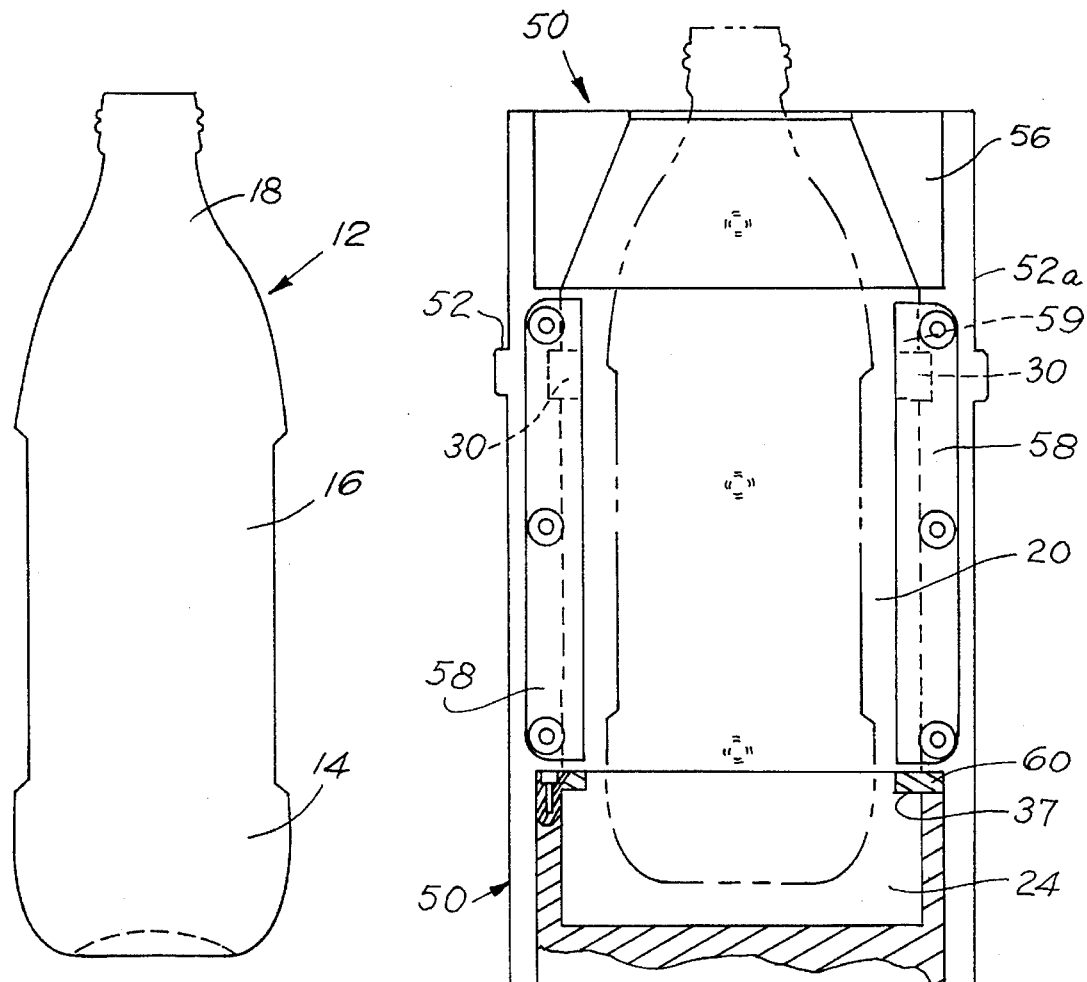
FIG. 6
FIG. 8
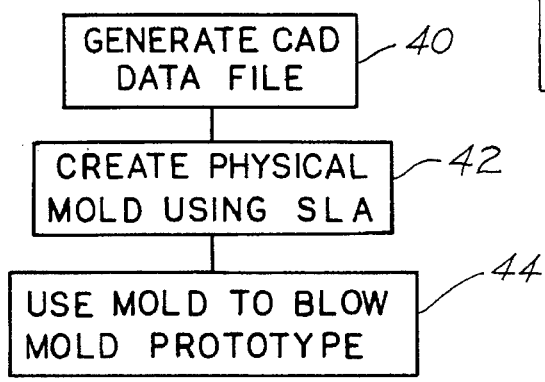
FIG. 7

5,458,825

UTILIZATION OF BLOW MOLDING TOOLING MANUFACTURED BY STEROLITHOGRAPHY FOR RAPID CONTAINER PROTOTYPING

This is a continuation of application Ser. No. 08/106,471, filed Aug. 12, 1993, which is now abandoned.

BACKGROUND OF THE INVENTION

This invention relates to the production of articles by injection or blow molding, and more particularly, to a method for using stereolithography to produce molds for injection or blow molding apparatus.

Prototype containers have been produced by having a craftsman carve a solid pattern out of a section of wood or plastic. This was very common practice ten to fifteen years ago and is still practiced today. The advantage of this method of producing prototype containers is primarily that the process is relatively inexpensive. A disadvantage of this process is that the models frequently are different than what the designer had in mind. In addition, if more than one model is requested, there is a high probability that the models produced will not be identical. It is also difficult to convey end use properties of a plastic container with a wood model.

An improvement over the hand production of models included the use of computer aided design (CAD) models to generate the control signals for computer numerical control (CNC) paths for a cutting tool. Computer numerical control machining requires a CAD model to determine the paths for the cutting tool to follow when cutting actual steel tooling. Using this technology, it is possible to cut a single cavity, prototype tool from aluminum or other metal. Disadvantages of this method are that it is costly, typically $15,000 to produce a 2 liter beverage container, and usually requires 8–10 weeks in lead time. An advantage of this method is the metal tool has a longer lifetime than other prototype tools. However, this is not a great consideration for a prototype tool because a prototype tool will be used for limited production, typically producing only 50 to 100 parts.

The introduction of epoxy molds has provided a way in which a mold can be produced relatively quickly for less expense than cutting metal molds, yet still using the CAD design. Production of the epoxy mold begins with a pattern or model of the outside contour of the container, produced commonly using stereolithography. The two halves of the pattern or model of the container are then set into an aluminum shell and a castable epoxy is poured around the pattern or model. When the stereolithography pattern is removed, typically by melting the pattern, the void left in the epoxy mold has the shape of the container. An advantage of this process is that the epoxy mold represents the geometry and contours of the surface of the container fairly accurately, using the CAD generated solid pattern or model built on the stereolithography machine. Also, the process is fairly quick, taking approximately two weeks from initiation of the design work to the completion of the epoxy mold. A disadvantage associated with the use of epoxy molds is that the durability of epoxy molds is very limited in use. In some cases, the epoxy molds failed after only one or two production cycles. However, producing epoxy molds is considerably less expensive than manufacturing a metal tool with the cost of epoxy tools typically being in the range of $3500 to $4000.

SUMMARY OF THE INVENTION

The present invention provides a method for producing molds for use in the production of prototypes or for short run production. The molds are produced directly from photosensitive polymer or resin utilizing stereo-lithography equipment using a data file which is produced utilizing computer aided design apparatus. This is in contrast to known prototyping methods wherein the stereolithography process is used to produce a solid object representation of the article which, in turn, is used to manufacture an epoxy mold that is used in producing the article. The method according to the present invention eliminates the intermediate step of manufacturing epoxy molds, thereby reducing cost and production cycle time.

In accordance with the invention, a method for producing a mold for molding an article includes generating a data file utilizing a computer aided design apparatus to provide data representing all of the geometry and contours for the inner cavity of the mold required to mold the article and using the data file to create the mold as a physical object directly from photosensitive resin utilizing a stereolithographic apparatus. The mold which is created utilizing the stereolithographic apparatus has a mold cavity having the geometry and contours required to mold the article.

The mold is produced directly from photosensitive resin using stereolithography. For this procedure, the female mold cavity including all of the appropriate geometry and contours is designed using a computer aided design apparatus. The physical model of the mold is then created in the same fashion using stereolithographic apparatus. An important advantage in producing prototypes using the method of the present invention is that the total time frame from the inception of the design to the creation of the physical prototype is approximately 5 days, in contrast to the two week time period that is required to produce a prototype using known process which require the use of an epoxy mold. Another important advantage of producing the mold directly using stereolithography is the amount of complexity which can be manufactured into the mold or the prototypes produced using the mold. For example, internal temperature control channels can be designed and built into the mold without machining. Typically, the mold is designed in three sections including two mating halves and a bottom. With this type of mold design, different sections of the mold can be interchanged as the design for the various mold sections is verified and agreed upon.

This direct production method of tooling is particularly applicable to blow molding processes. Thus, further in accordance with the invention, there is provided a method for producing a prototype of an article using blow molding apparatus which includes generating a data file utilizing a computer aided design apparatus to provide data representing all of the geometry and contours for the surface of the inner cavity of the mold required to mold the prototype of the article and using the data file to create the mold as a physical object directly from photosensitive resin utilizing a stereolithographic apparatus. The mold which is created utilizing the stereolithographic apparatus has a mold cavity having the geometry and contours required to blow mold the prototype of the article. Then, the mold is positioned in the blow molding apparatus. A preform is introduced into the mold cavity and the preform is expanded against the surface of the inner cavity of the mold to produce the prototype of the article.

The invention consists of certain novel features and structural details hereinafter fully described, illustrated in

DESCRIPTION OF THE DRAWINGS

FIG. 6 is an elevation view of a container produced using the mold provided by the present invention;

FIG. 7 is a process flow chart for the process for producing a mold in accordance with the present invention; and, FIG. 8 is a top plan view illustrating one portion of the mold assembled with a mold retaining shell.

DESCRIPTION OF A PREFERRED EMBODIMENT

Figure 1:
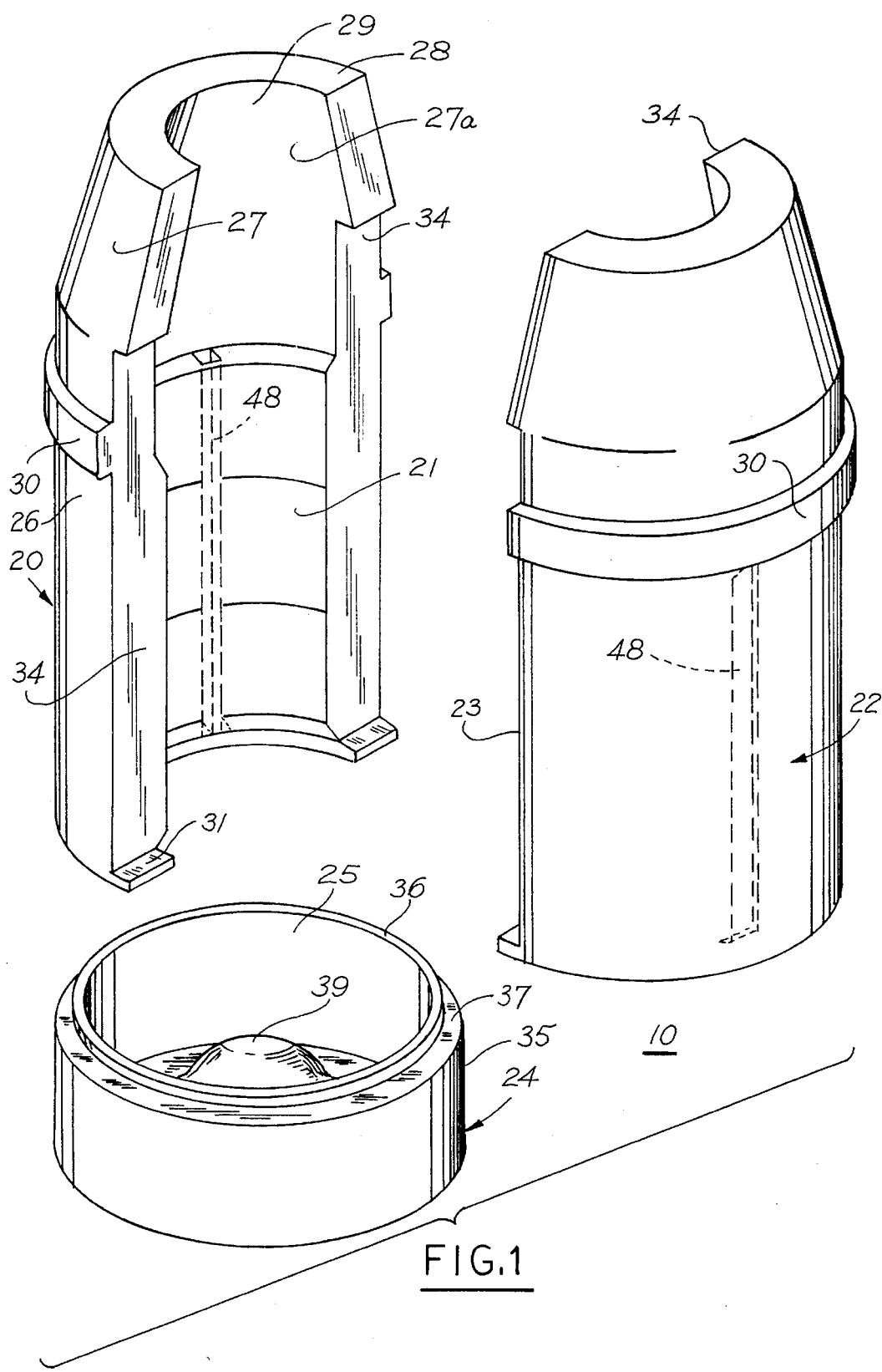
FIG. 1 is an exploded isometric view of a mold produced in accordance with the present invention.

Referring to FIGS. 1–5, there is illustrated a mold 10 for use in producing a three-dimensional object or article. The mold may be used for producing prototypes and/or in short production runs. By way of example, the article 12, is a beverage container, such as the beverage container shown in FIG. 6. The container has a base or bottom 14, a body or sidewall portion 16, and a neck portion 18.

The mold 10 is a three-section mold which includes a mold half section 20, a mold half section 22, and a base or bottom section 24. The mold half sections 20 and 22 define respective mold cavity portions 21 and 23. The mold half sections 20 and 22 are identical in shape and are adapted to be mated together during molding operations to form the body or sidewall portion and the neck portion of the container. The mold bottom section 24 defines a mold cavity portion 25. The mold bottom section 24 closes the bottom of the mold cavity portions 21 and 23 defined by the two mold halves 20 and 22 during molding operations. The multi-section mold aids in the venting of the mold which is necessary for the release of air during the blow molding process.

Figure 2:
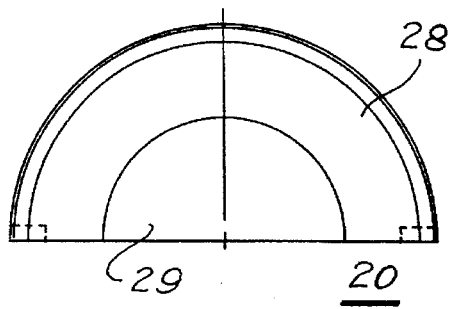
FIG. 2 is a top plan view of one of the mold halves of the mold illustrated in FIG. 1.
Figure 3:
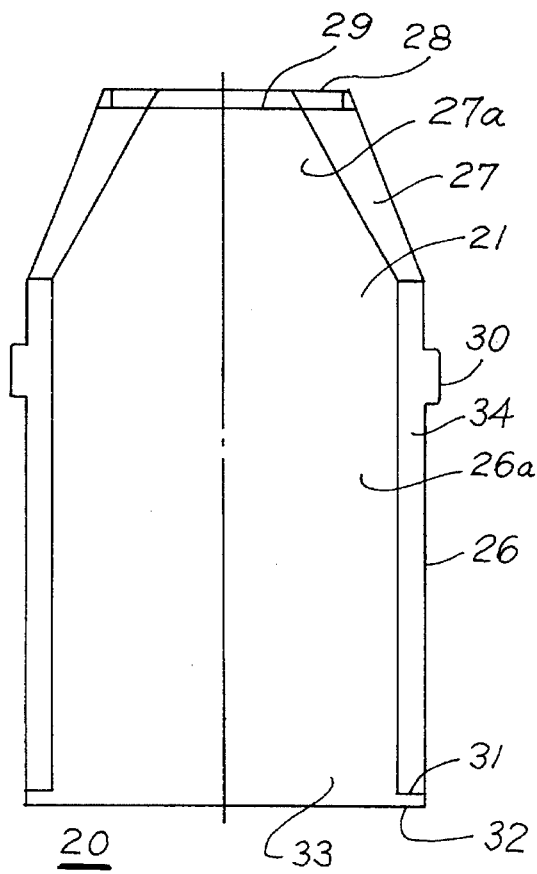
FIG. 3 is a front elevation view of the mold half illustrated in FIG. 2.

Referring to FIGS. 1–3, the mold half 20 has a semicylindrical body portion 26 and a semi-frustoconical upper portion 27 having a flat upper surface 28 with an arcuate opening 29 therethrough. The inner surface 26a of the body portion and the inner surface 27a of the upper portion 27 are formed with the shape and contours for the outer surface to the container 12. The mold portion 20 has an arcuate flange 30 on its outer surface near the top of its body portion 26 and a flange 31 on its outer surface at the bottom of its body portion. The bottom surface 32 has an arcuate opening 33 therethrough. The mold half 20 has flat vertical side surfaces 34 which mate with corresponding surfaces of the mold half 22 in use in a blow molding machine. The mold half 22 is identical to mold half 20 and accordingly, corresponding parts have been given the same reference numeral.

Figure 4:
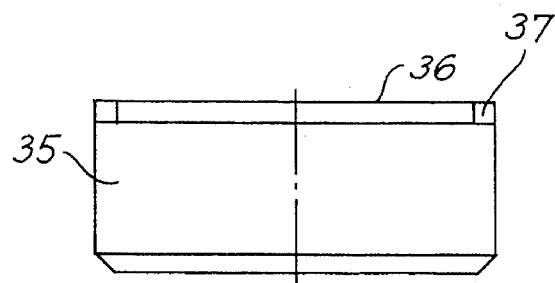
FIG. 4 is an elevation view of the mold bottom of the mold illustrated in FIG. 1.
Figure 5:
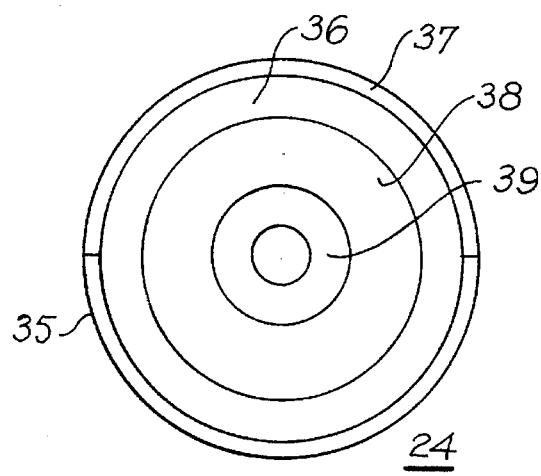
FIG. 5 is a top plan view of the mold bottom.

Referring to FIGS. 1, 4 and 5, the mold bottom 24 has a cylindrical sidewall 35 with an annular upper surface 36 having an annular recess 37 formed therein along the outer peripheral edge. The inner surface 38 of the mold bottom is formed with the shape and contours of the outer surface of the bottom of the container 12. The bottom inner surface has a raised center portion 39 which defines a concave bottom surface for the container 12.

In accordance with the invention, the three-section mold 10 is produced directly from a photosensitive resin using stereolithography, thus bypassing the intermediate step of manufacturing an epoxy mold which is required in prototyping processes presently practiced. Referring to FIG. 7, in the first step of the process represented by block 40, the mold 10 is designed using a computer aided design (CAD) apparatus to generate a data file that includes data representing all of the appropriate geometry and contours for the surface of the female mold cavity that are required to mold the prototype container 12. This computer aided design procedure is the same as the procedure that has been used heretofore for obtaining a CAD data file for producing the model or pattern from which an epoxy mold can be produced. However, in accordance with the present invention, the CAD data file that is generated by the computer aided design apparatus is the data file that is required for producing the physical, three-dimensional mold used for blow molding the prototype.

The data file produced using a computer aided design apparatus is translated to a solid object using a stereolithographic apparatus to create a physical, three-dimensional mold, the process step represented by block 42 in FIG. 7. The mold 10 created using the CAD data file has a mold cavity with the geometry and contours that are required to blow mold the prototype container 12. The mold 10 is mounted in a blow molding machine and is used to blow mold the prototype container 12, the process step represented by block 44 in FIG. 7. That is, the CAD data file is used to create a mold as a physical object directly from photosensitive polymer or resin utilizing a stereolithographic apparatus. The stereolithographic apparatus creates the mold layer by layer using a photosensitive polymer. The manner in which the stereolithographic apparatus functions to produce a three dimensional object is known in the art and such apparatus is commercially available. One stereolithographic apparatus suitable for this purpose is the type SLA-500 stereolithography machine which is commercially available from 3D Systems, Inc., located in Valencia, Calif.

Because stereolithography is well known in the art, the apparatus and its method of operation will not be described in detail. Briefly, the solid model for the mold 10 is produced from a photosensitive polymer or resin by exposing the polymer one layer at a time to a laser beam of the stereolithography equipment which sets or cures the photosensitive resin in accordance with computer commands to produce the desired shape and contours for the mold cavity. Typically, the layers are 0.0025 to 0.0300 inches thick, and, in the exemplary embodiment, are 0.010 inches thick. The successive layers of the photosensitive polymer or resin are formed on a platform which is adapted to be lowered into a vat of the polymer to receive a film of the polymer and then raised to subject the next layer of the polymer or resin to the laser beam until the complete physical object has been formed. The mold is formed from the bottom to the top in successive laser curing operations. Conventionally, the two mold halves 20 and 22 and the mold bottom 24 are produced individually and a separate CAD data file is produced for each mold section. However, the three CAD data files can be merged, permitting the three mold sections to be produced in a single stereo-lithographic operation as is known in the art.

An important advantage of producing the blow mold 10 directly from the photosensitive resin using a stereolithographic process is that the total time frame from the inception of the design to the blown container is approximately five days, in contrast to the two weeks required for prototyping processes which utilize an epoxy mold. Another advantage of having the mold surfaces manufactured using stereolithography is the amount of complexity which can be manufactured into the model. Internal thermal control channels or temperature (hot or cold) channels 48 are designed using the computer aided design and are formed into the mold 10 by the stereolithographic apparatus. In the exemplary embodiment, the thermal control channels 48 are formed in the two mold halves 20 and 22. The thermal control channels 48 are provided in the mold 10 without requiring any machining.

The use of the mold 10 for blow molding the container 12 is carried out in the conventional manner. A mold support shell assembly 50 supports the mold sections 20, 22, and 24 in the blow molding machine with the mold halves 20 and 22 oriented vertically and the mold bottom portion 24 located below the mold halves 20 and 22.

Referring to FIG. 8, the mold support shell assembly includes a two mold support shells, such as the mold support shell 52 shown in FIG. 8, one for supporting each mold half, such as mold half 20 shown in FIG. 8. Each support shell 52 includes a neck portion 56 which is adapted to fit into the support shell at one end 52a thereof. The support shell has an arcuate channel 59 formed in its inner surface which receives the arcuate flange 30 of the mold half 20. The mold section 20 is held in place in the mold support shell 52 by a pair of flat retainer strips 58, one located on each side of the mold support shell 52. The mold half 22 is mounted secured in its associated mold support shell in a like manner.

The mold support assembly 50 further includes a mold bottom support 54 for supporting the mold bottom portion 24. The mold bottom support 54 is adapted to mount on a rod 57 which is reciprocated vertically toward and away from the mold halves and associated mold support shells during blow molding operations as is known. The mold bottom support 54 has an annular retainer ring 60, which is received in the annular recess 37 of the mold bottom 24, holds the mold bottom portion 24 in place in the mold bottom support 54.

The three part mold shell assembly 50 with the three mold portions retained therein is mounted in the blow mold machine, with the mold halves oriented vertically, to be moved into and out of engagement with one another, respectively closing and opening the mold, during the blow molding process as is known. The mold bottom portion 24 is carried with the mold bottom support which is moved up and down in correspondence with the opening and closing of the mold to close the bottom portion of the mold cavity in the manner known in the art. The blow mold apparatus operates in a conventional manner to blow a preform against the inner cavity of the mold 10 to form the prototype container. The preform that is used to produce the prototype of the article can be produced using the method of the present invention.

Thus, it can be seen that the present invention has provided a method for direct production of tooling for molding a prototype of an article and/or for short production runs. The method includes generating a data file utilizing a computer aided design apparatus to provide data representing all of the geometry and contours for the inner cavity of the mold required to mold the article and using the data file to create the mold as a physical object directly from photosensitive resin utilizing a stereolithographic apparatus. The mold which is created utilizing the stereolithographic apparatus has a mold cavity having the geometry and contours required to mold the article. This direct production method of tooling is particularly applicable to blow molding processes for producing a prototype of an article using blow molding apparatus.

One advantage of having the mold surfaces manufactured using stereolithography is the amount of complexity which can be manufactured into the model. Internal temperature control channels can be designed and built into the mold without machining. Because the mold is a multi-section mold, different sections of the mold can be interchanged as different sections of the mold design are verified and agreed upon. For example, if the base of a container had been designed and verified, that portion of the mold could be reused while the label panel had to be rebuilt.

We claim:

1. A method for producing a prototype of a hollow article using a blow molding apparatus comprising the steps of:

generating a data file utilizing a computer aided design apparatus to provide data representing all of the geometry and contours for the surface of the inner cavity of the female mold required to mold the prototype of the article;

using the data file to control a stereolithographic apparatus to create as a physical object directly from photosensitive resin a multi-section mold for use with the blow molding apparatus, the mold which is created utilizing the stereolithographic apparatus including at least first and second mating mold halves, which when assembled together define a female mold having an inner cavity the surface of which has the geometry and contours required to blow mold the prototype of the article, said first and second mating mold halves being reusable for blow molding more than one prototype of the article and for short production runs;

removably mounting in a mold supporting means said first and second mating mold halves formed from photosensitive resin to form a mold assembly for use in the blow molding apparatus;

mounting the mold assembly in the blow molding apparatus;

introducing a preform into the inner cavity of the female mold; and expanding the preform against the contoured surface of the inner cavity of the female mold to produce the prototype of the article.

2. The method according to claim 1, wherein the step of generating a data file further includes providing data representing the geometry and contours for a plurality of thermal control channels in the mold, whereby the mold that is constructed from photosensitive resin utilizing the stereolithographic apparatus includes a plurality of thermal control channels.

3. The method according to claim 1, wherein said mold supporting means comprises a metal supporting shell, said supporting shell being adapted to mount said first and second mating mold halves which are formed from photosensitive resin and to retain said mold halves of said mold during blow molding operations.

4. The method according to claim 1, wherein said mold comprises said first and second mating halves and a bottom made of said photosensitive resin, and said mold supporting means comprises first and second mating support portions for supporting said first and second mating mold halves, respectively, made of said photosensitive resin and a bottom support portion for supporting the mold bottom made of said photosensitive resin, and including the steps of applying a retaining means to the support portions for retaining said mold halves and mold bottom in the respective support portions of said mold supporting means as said first and second mold halves and said mold bottom are moved into and out of engagement with one another during blow molding operations.

5. A method for producing a prototype of a beverage container using a blow molding apparatus comprising the steps of:

generating a data file utilizing a computer aided design apparatus to provide data representing all of the geometry and contours for the inner surface of the cavity of a female mold for use in blow molding the prototype of said beverage container;

using the data file to control a stereolithographic apparatus to create the female mold as a physical object directly from photosensitive resin, the mold which is created utilizing the stereolithographic apparatus being a multi-section mold that includes at least first and second mating mold halves, which when assembled together define a female mold having an inner cavity, the surface of which has the geometry and contours required to blow mold a prototype of the beverage container, said first and second mating mold halves being reusable for blow molding more than one prototype of the beverage container;

removably mounting in a mold supporting means said first and second mating mold halves formed from photosensitive resin to form a mold assembly for use in the blow molding apparatus;

mounting the mold assembly in the blow molding apparatus;

introducing a preform into the inner cavity of the female mold of said mold assembly; and expanding the preform against said contoured surface of the inner cavity of the female mold to produce the prototype of the beverage container, whereby the shape of the outer surface of the prototype produced is defined by the geometry and contours of the surface of the inner cavity of said female mold.

6. A method for producing at least first and second prototypes of a hollow article using a blow molding apparatus comprising the steps of:

controlling a stereolithographic apparatus to create as a physical object directly from a photosensitive resin a multi-section female mold for use with the blow molding apparatus for producing a first prototype of the hollow article, said multi-section mold including at least first and second mating mold sections which, when assembled together, define an inner cavity for the female mold having a surface that has the geometry and contours required to blow mold said first prototype of the article;

removably mounting in a mold supporting means said first and second mating mold sections which are formed from photosensitive resin to form a mold assembly for use in the blow molding apparatus;

mounting the mold assembly in the blow molding apparatus;

introducing a preform into the inner cavity of the female mold of the mold assembly;

expanding the preform against the contoured surface of the inner cavity of the female mold of the mold assembly to produce a first prototype of the article;

controlling said stereolithographic apparatus to create as a physical object directly from photosensitive resin a further mold section which is adapted to mate with said first mold section;

removably mounting said further mold section of said photosensitive resin in said mold supporting means in place of said second mold section to form with said first mold section a further mold assembly for use in the blow molding apparatus, said first mold section and said further mold section, when assembled together, defining an inner cavity having a surface that has the geometry and contours required to blow mold a second prototype of the article that is different from said first prototype of the article;

mounting said further mold assembly in the blow molding apparatus;

introducing a preform into the inner cavity of said further mold assembly;

and expanding the preform against the contoured surface of the inner cavity of said female mold of the mold assembly to produce said second prototype of the article.

* * * * *